US007277098B2

(12) United States Patent
Xu et al.

(10) Patent No.: US 7,277,098 B2
(45) Date of Patent: Oct. 2, 2007

(54) APPARATUS AND METHOD OF AN IMPROVED STENCIL SHADOW VOLUME OPERATION

(75) Inventors: Jiangming Xu, San Jose, CA (US); Wen-Chung Chen, Cupertino, CA (US); Yuanfeng Wang, Shanghai (CN); Liang Li, Shanghai (CN); John Brothers, Calistoga, CA (US); Boris Prokopenko, Milpitas, CA (US)

(73) Assignee: VIA Technologies, Inc., Hsin-Tien, Taipei (TW)

( * ) Notice: Subject to any disclaimer, the term of this patent is extended or adjusted under 35 U.S.C. 154(b) by 437 days.

(21) Appl. No.: 10/924,068

(22) Filed: Aug. 23, 2004

(65) Prior Publication Data
US 2006/0038822 A1    Feb. 23, 2006

(51) Int. Cl.
G06T 9/00    (2006.01)
G06T 15/50   (2006.01)
G06F 12/02   (2006.01)

(52) U.S. Cl. .................. 345/555; 345/426; 345/544
(58) Field of Classification Search ............. 345/555, 345/530, 418, 419, 421, 422, 426, 558, 544, 345/557
See application file for complete search history.

(56) References Cited

U.S. PATENT DOCUMENTS

| 5,266,941 | A  | * | 11/1993  | Akeley et al. ............. 345/536 |
| 6,104,417 | A  | * | 8/2000   | Nielsen et al. ............. 345/542 |
| 6,384,822 | B1 |   | 5/2002   | Bilodeau et al. |
| 6,486,887 | B1 | * | 11/2002  | Lewis ..................... 345/587 |
| 6,580,427 | B1 | * | 6/2003   | Orenstein et al. .......... 345/422 |
| 6,763,175 | B1 | * | 7/2004   | Trottier et al. ............. 386/52 |
| 6,798,421 | B2 | * | 9/2004   | Baldwin ................... 345/557 |
| 6,801,203 | B1 | * | 10/2004  | Hussain ................... 345/506 |
| 6,809,730 | B2 | * | 10/2004  | Howson ................... 345/426 |
| 6,825,847 | B1 | * | 11/2004  | Molnar et al. .............. 345/555 |
| 6,903,741 | B2 | * | 6/2005   | Corbetta .................. 345/426 |
| 7,119,809 | B1 | * | 10/2006  | McCabe ................... 345/506 |
| 2005/0134588 | A1 | * | 6/2005  | Aila et al. ................. 345/426 |

OTHER PUBLICATIONS

Chinese Language Office Action, mailed August 25, 2006.

* cited by examiner

*Primary Examiner*—Ulka Chauhan
*Assistant Examiner*—Joni Hsu
(74) *Attorney, Agent, or Firm*—Thomas, Kayden, Horstemeyer & Risley

(57) ABSTRACT

The computer graphics system is configured to improve the performance of a stencil shadow volume method for rendering shadows. The apparatus and methods utilize a combination of compressed and uncompressed stencil buffers in coordination with compressed and uncompressed depth data buffers. An uncompressed stencil buffer is capable of storing stencil shadow volume data for each pixel and a compressed stencil buffer is capable of storing stencil shadow volume data for a group of pixels. The compressed stencil buffer is utilized with a compressed stencil buffer cache to perform a stencil shadow volume operation more efficiently than present methods.

20 Claims, 14 Drawing Sheets

TWO DIMENSIONAL
REPRESENTATION OF SHADOW
VOLUMES

ZL1 SUBTILE STATUS LOGIC

APPARATUS AND METHOD OF AN IMPROVED STENCIL SHADOW VOLUME OPERATION

FIELD OF THE INVENTION

The present invention generally relates to computer graphics systems, and more particularly to a method and apparatus for generating a shadow effect using a shadow volumes approach.

BACKGROUND

As is known, the art and science of three-dimensional ("3-D") computer graphics concerns the generation, or rendering, of two-dimensional ("2-D") images of 3-D objects for display or presentation onto a display device or monitor, such as a Cathode Ray Tube (CRT) or a Liquid Crystal Display (LCD). The object may be a simple geometry primitive such as a point, a line segment, a triangle, or a polygon. More complex objects can be rendered onto a display device by representing the objects with a series of connected planar polygons, such as, for example, by representing the objects as a series of connected planar triangles. All geometry primitives may eventually be described in terms of one vertex or a set of vertices, for example, coordinate (x, y, z) that defines a point, for example, the endpoint of a line segment, or a corner of a polygon.

To generate a data set for display as a 2-D projection representative of a 3-D primitive onto a computer monitor or other display device, the vertices of the primitive are processed through a series of operations, or processing stages in a graphics-rendering pipeline. A generic pipeline is merely a series of cascading processing units, or stages, wherein the output from a prior stage serves as the input for a subsequent stage. In the context of a graphics processor, these stages include, for example, per vertex operations, primitive assembly operations, pixel operations, texture assembly operations, rasterization operations, and fragment operations.

In a typical graphics display system, an image database (e.g., a command list) may store a description of the objects in the scene. The objects are described with a number of small polygons, which cover the surface of the object in the same manner that a number of small tiles can cover a wall or other surface. Each polygon is described as a list of vertex coordinates (X, Y, Z in "Model" coordinates) and some specification of material surface properties (i.e., color, texture, shininess, etc.), as well as possibly the normal vectors to the surface at each vertex. For three-dimensional objects with complex curved surfaces, the polygons in general must be triangles or quadrilaterals, and the latter can always be decomposed into pairs of triangles.

A transformation engine transforms the object coordinates in response to the angle of viewing selected by a user from user input. In addition, the user may specify the field of view, the size of the image to be produced, and the back end of the viewing volume so as to include or eliminate background as desired.

Once this viewing area has been selected, clipping logic eliminates the polygons, (i.e., triangles) which are outside the viewing area and "clips" the polygons, which are partly inside and partly outside the viewing area. These clipped polygons will correspond to the portion of the polygon inside the viewing area with new edge(s) corresponding to the edge(s) of the viewing area. The polygon vertices are then transmitted to the next stage in coordinates corresponding to the viewing screen (in X, Y coordinates) with an associated depth for each vertex (the Z coordinate). In a typical system, the lighting model is next applied taking into account the light sources. The polygons with their color values are then transmitted to a rasterizer.

For each polygon, the rasterizer determines which pixel positions the polygon and attempts to write the associated color values and depth (Z value) into frame buffer cover. The rasterizer compares the depth values (Z) for the polygon being processed with the depth value of a pixel, which may already be written into the frame buffer. If the depth value of the new polygon pixel is smaller, indicating that it is in front of the polygon already written into the frame buffer, then its value will replace the value in the frame buffer because the new polygon will obscure the polygon previously processed and written into the frame buffer. This process is repeated until all of the polygons have been rasterized. At that point, a video controller displays the contents of a frame buffer on a display a scan line at a time in raster order.

With this general background provided, reference is now made to FIG. 1, which shows a functional flow diagram of certain components within a graphics pipeline in a computer graphics system. It will be appreciated that components within graphics pipelines may vary from system to system, and may also be illustrated in a variety of ways. As is known, a host computer 10 (or a graphics API running on a host computer) may generate a command list 12, which comprises a series of graphics commands and data for rendering an "environment" on a graphics display. Components within the graphics pipeline may operate on the data and commands within the command list 12 to render a screen in a graphics display.

In this regard, a parser 14 may retrieve data from the command list 12 and "parse" through the data to interpret commands and pass data defining graphics primitives along (or into) the graphics pipeline. In this regard, graphics primitives may be defined by location data (e.g., x, y, z, and w coordinates) as well as lighting and texture information. All of this information, for each primitive, may be retrieved by the parser 14 from the command list 12, and passed to a vertex shader 16. As is known, the vertex shader 16 may perform various transformations on the graphics data received from the command list. In this regard, the data may be transformed from World coordinates into Model View coordinates, into Projection coordinates, and ultimately into Screen coordinates. The functional processing performed by the vertex shader 16 is known and need not be described further herein. Thereafter, the graphics data may be passed onto rasterizer 18, which operates as summarized above.

Thereafter, a z-test 20 is performed on each pixel within the primitive being operated upon. As is known, comparing a current z-value (i.e., a z-value for a given pixel of the current primitive) in comparison with a stored z-value for the corresponding pixel location performs this z-test. The stored z-value provides the depth value for a previously rendered primitive for a given pixel location. If the current z-value indicates a depth that is closer to the viewer's eye than the stored z-value, then the current z-value will replace the stored z-value and the current graphic information (i.e., color) will replace the color information in the corresponding frame buffer pixel location (as determined by the pixel shader 22). If the current z-value is not closer to the current viewpoint than the stored z-value, then neither the frame buffer nor z-buffer contents need to be replaced, as a previously rendered pixel will be deemed to be in front of the current pixel.

Again, for pixels within primitives that are rendered and determined to be closer to the viewpoint than previously-stored pixels, information relating to the primitive is passed on to the pixel shader 22 which determines color information for each of the pixels within the primitive that are determined to be closer to the current viewpoint. Color information includes whether or not pixels are within a shadow. As known in the prior art, one method for determining shadowed regions in a scene is through the use of shadow volumes.

Reference is now made to FIG. 2, which illustrates the shadow volume approach of generating a shadow effect in a computer graphics system. The shadow volume 34, as is known, defines the space in the shadow of a particular occluder 32 for a particular light source 30. Each polygon facing a light source 30 is an occluder 32 and therefore generates a shadow volume 34. A pixel 38 that falls within a shadow volume is rendered as being located in a shadow. The shadow volume method determines whether a pixel 38, 39 falls within a shadow volume 34 by counting the number times the ray 35 between the pixel 38, 39 and the viewer 36 enter 33 and exit 37 shadow volumes 34. If the number of times a ray enters 33 shadow volumes 34 is the same as the number of times the ray exits 37 shadow volumes 34 then the pixel 38, 39 is not in a shadow. For example, the ray 35 from the viewer 36 to pixel A 38 has one entry 33 into the shadow volume 34 and no exits 37 from the shadow volume 34. Thus, pixel A 38 is in a shadow. Similarly, since the ray 31 from the viewer 36 to pixel B 39 enters 33 the shadow volume 34 one time and exits 37 the shadow volume 34 one time, pixel B 39 is not in a shadow.

Since the ray tracing technique is very time consuming, especially with multiple occluders and multiple light sources, the stencil shadow volume method simplifies the operation by performing a simple in/out counting method using a stencil buffer, sometimes referred to as a stencil buffer level2 or SL2. The stencil buffer, SL2, stores and processes data for each pixel to perform a variety of functions including the stencil shadow volume method. Whether the pixel is in the shadow is determined by performing a z-test on the front-facing and back-facing polygons of shadow volumes relative to either the viewer or a maximum depth plane. For example, in one implementation of the stencil shadow volume approach, the stencil buffer value would be incremented if the front-facing polygon passes the z-test and the stencil buffer value would be decremented if the back-facing polygon passes the z-test. Thus, if the final stencil value is zero, the pixel is not in a shadow.

Referring now to FIG. 3, the stencil shadow volume method begins by clearing the stencil buffer 40 and rendering the scene with diffuse colors 42. This rendering provides data for the color buffer and the depth buffer 43, also referred to as the z-buffer. The z-buffer and color buffer updates are turned off 44 except for the stencil value that may reside in the z-buffer. For each light, the shadow volume is generated for each occluder and the front-facing polygons of the shadow volume are rendered 46. The stencil buffer value is incremented 47 for each pixel on which a front-facing polygon is drawn. The same operation is performed with the back-facing polygons 48, except the stencil buffer value is decremented 49 for each pixel on which a back-facing polygon is drawn. The pass where the stencil value is incremented and decremented is referred to as the stencil shadow volume pass. Objects in the shadow will be those having a non-zero stencil value 50 and are rendered accordingly. Objects not in the shadow will have a stencil value 50 of zero and are rendered with specular color 52. The pass where the pixels outside a shadow are rendered with specular color is referred to as the specular color pass. Referring back to FIG. 1, once color information is computed by the pixel shader 22, the information is stored within the frame buffer 24.

Referring back to FIG. 2, for example, the stencil buffer value for pixel A 38 is incremented one time for the front-facing shadow volume polygon that would be rendered at the entry 33 and not decremented because there are no back-facing shadow volume polygons for pixel A 38. The non-zero value remaining in the stencil buffer for pixel A 38 indicates that pixel A 38 is in a shadow. Similarly, the stencil buffer value for pixel B 39 is incremented one time for the front-facing shadow volume polygon that would be rendered at the entry 33 and decremented one time for the back-facing shadow volume polygon that would be rendered at the exit 37. Since the stencil buffer value is zero, pixel B 39 is not in a shadow and would be rendered with specular color. Although the example in FIG. 2 has a single occluder and a single light source, the stencil shadow volume approach works for multiple shadows created by multiple occluders and multiple light sources.

Reference is now made to FIG. 4, which illustrates a common implementation of a compressed z-data processing unit, sometimes referred to as ZL1. As is known, system performance is improved through the use of ZL1, which processes the z-data for a block or tile of multiple pixels. For pixels within a tile in which the z-data exceeds the range of the compression format associated with ZL1, the z-data must be processed at the pixel level in a pixel z-data processing unit, sometimes referred to as ZL2.

The ZL1 and ZL2 terminology generally stand for Z Buffer Level1 and Z Buffer Level2. There are several names for this type of algorithm including Hyper Z and Heirarchy Z Buffer. The two levels of Z Buffers allow the storage of higher level depth information for a larger processing unit, such as a tile, and the storage of depth information for the smallest granularity, such as an individual pixel in a screen. One advantage of ZL1 is to reduce the computing complexity of depth data in the rendering pipeline.

A tile generator 60 generates tile data for the tile of pixels, eight-by-eight for example, and sends a request to a cache 64, called the ZL1 cache. The tile data is sent to ZL1 62, which in turn communicates with the ZL1 cache 64. For the pixels having z-data that cannot be processed in ZL1 62, the z-data is processed in the pixel z-data processing unit 66, ZL2, in coordination with a ZL2 cache 68. In this configuration ZL1 62 can reject up to sixty-four pixels in one cycle and the non-rejected pixels are marked as accepted or retested to reduce the ZL2 66 memory traffic.

Although ZL1 62 reduces the memory read traffic for ZL2 66, the current solution cannot perform the stencil operation very efficiently. In this configuration, when the stencil operation is performed, ZL1 62 just marks all pixels as retest to ensure that the stencil operation will not leak. The rejected pixels will also have a stencil operation requiring access to ZL2 66. Thus during the stencil operation, ZL1 62 will be essentially by-passed resulting in significant memory traffic.

This is especially true when a ZL1 tile (subtile) is accepted or rejected after a z-compare function. Since the stencil operation will happen even if the subtile passes the z-test, ZL1 62 has to change the subtile from the ACCEPT state to the RETEST state and pass it down to ZL2 66. Currently ZL2 66, and the stencil buffer, SL2, may be combined such that the format of the ZL2/SL2 processing unit is thirty-two bits having a twenty-four-bit z-value and eight bits of stencil value. In the ACCEPT/REJECT states, the entire thirty-two-bit z/stencil value has to be read just to use the eight bit stencil value. This results in significant inefficiencies in terms of memory bandwidth. Although one solution would be to use separated stencil buffer and z-buffer, this scheme would result in a very small memory request. For example, for eight pixels, the memory request for an eight-bit stencil value would only be sixty-four bits, resulting in a great waste of memory traffic.

Although the foregoing has only briefly summarized the operation of the various processing components and techniques for generating shadows, persons skilled in the art recognize that processing the graphics data is quite intense. Consequently, it is desired to improve processing efficiency wherever possible.

SUMMARY

Certain objects, advantages and novel features of the disclosure will be set forth in part in the description that follows and in part will become apparent to those skilled in the art upon examination of the following or may be learned with the practice of the disclosure. The objects and advantages of the invention may be realized and obtained by means of the instrumentalities and combinations particularly pointed out in the appended claims.

One embodiment of the present disclosure is directed to an apparatus configured to improve a stencil shadow volume operation, the apparatus for use in a computer graphics system comprising a compressed stencil buffer, where the compressed stencil buffer comprises compressed stencil shadow volume data record for a group of pixels.

Another embodiment of the present disclosure is directed to a system comprising a graphics processing unit configured to generate a shadow effect using a stencil shadow volume operation on a group of pixels. As is known to one skilled in the art, a group of pixels may comprise a single tile, a subtile, or more than a tile. The system further comprises a first stencil buffer and a first stencil buffer cache configured to communicate with the first stencil buffer.

Other embodiments of the present disclosure are directed to methods for implementing a stencil shadow volume method in a computer graphics system. In this regard, one embodiment of such a method, among others, performs the stencil shadow volume method using a tile stencil buffer in conjunction with a pixel stencil buffer.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

The accompanying drawings incorporated in and forming a part of the specification illustrate several aspects of the present invention, and together with the description serve to explain the principles of the invention. Moreover, in the drawings, like reference numerals designate corresponding parts throughout the several views. In the drawings.

DETAILED DESCRIPTION

Figure 1:
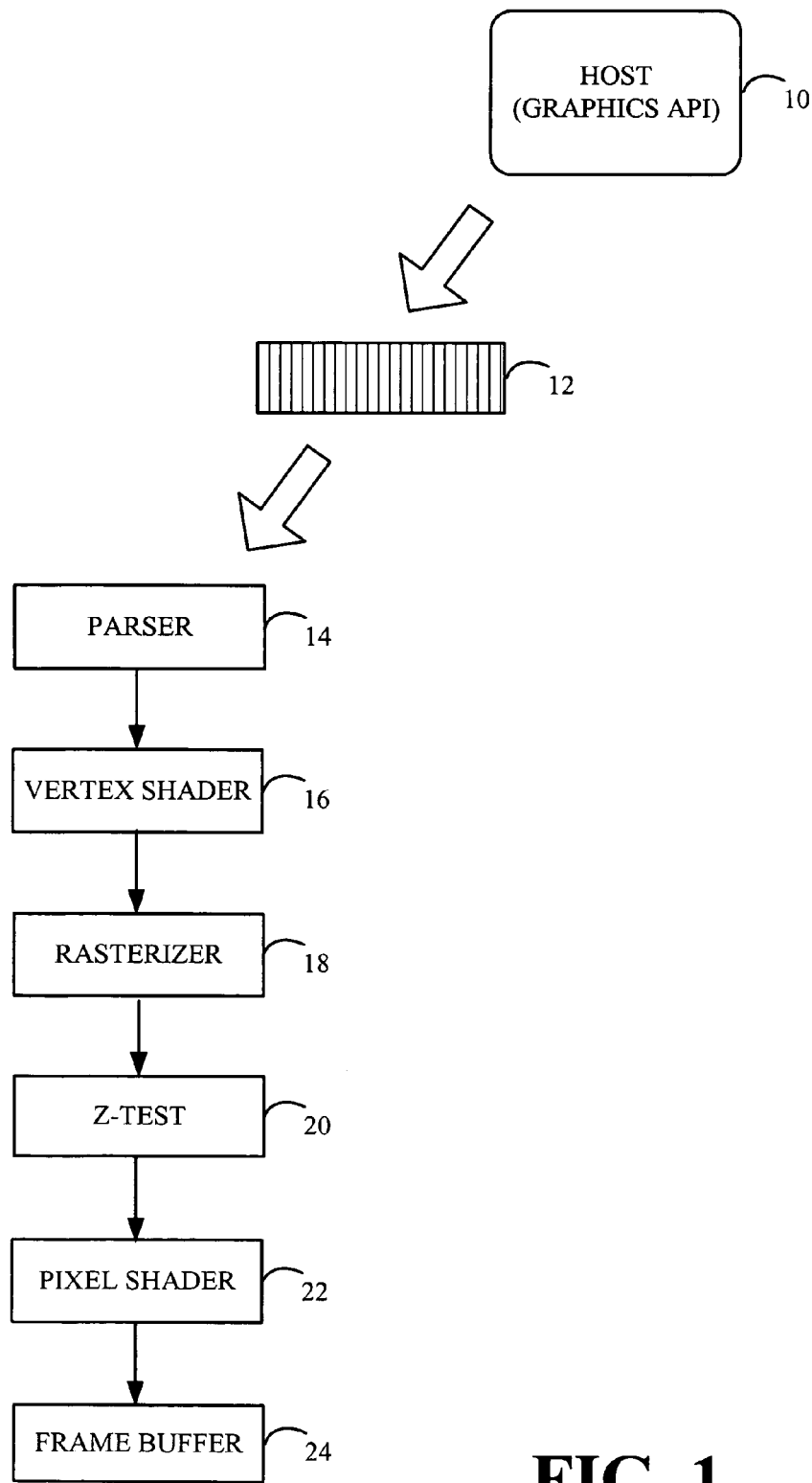
FIG. 1 is a block diagram of a conventional graphics pipeline, as is known in the prior art.
Figure 2:
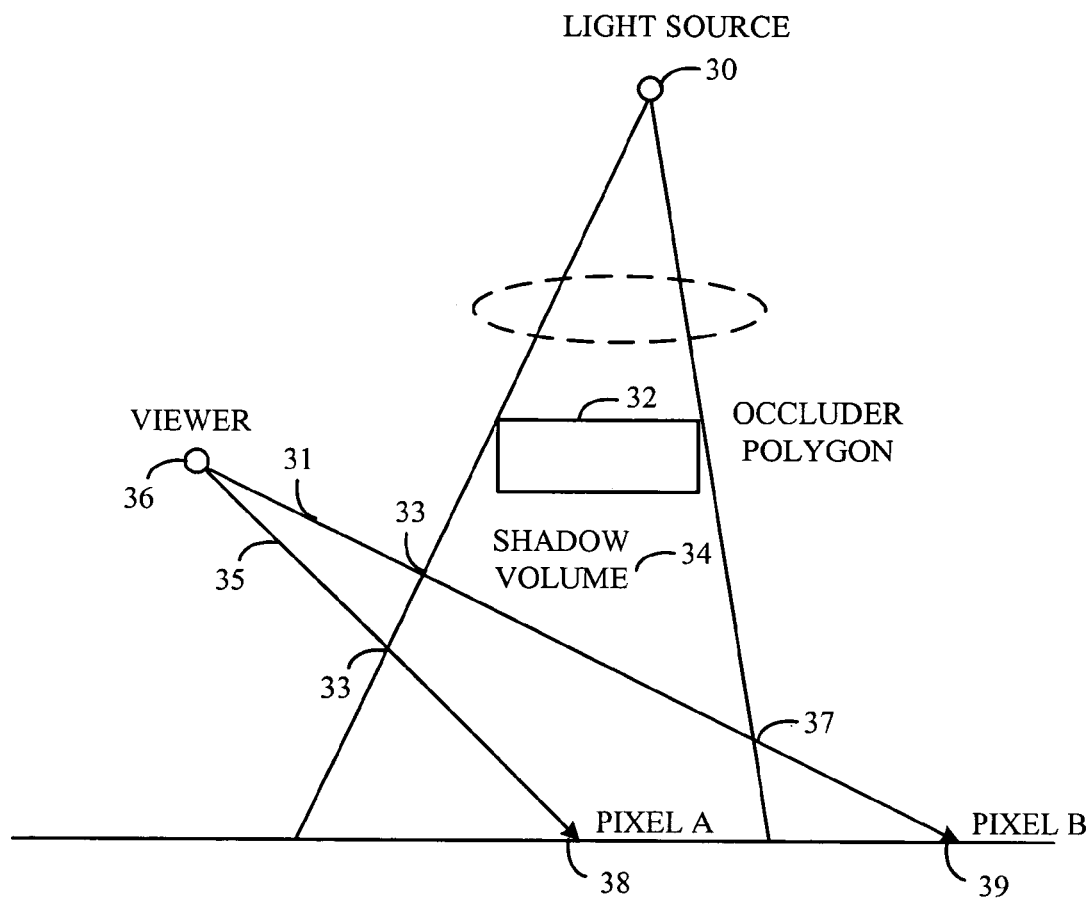
FIG. 2 is a two-dimensional representation of shadow volumes, as is known in the prior art.
Figure 3:
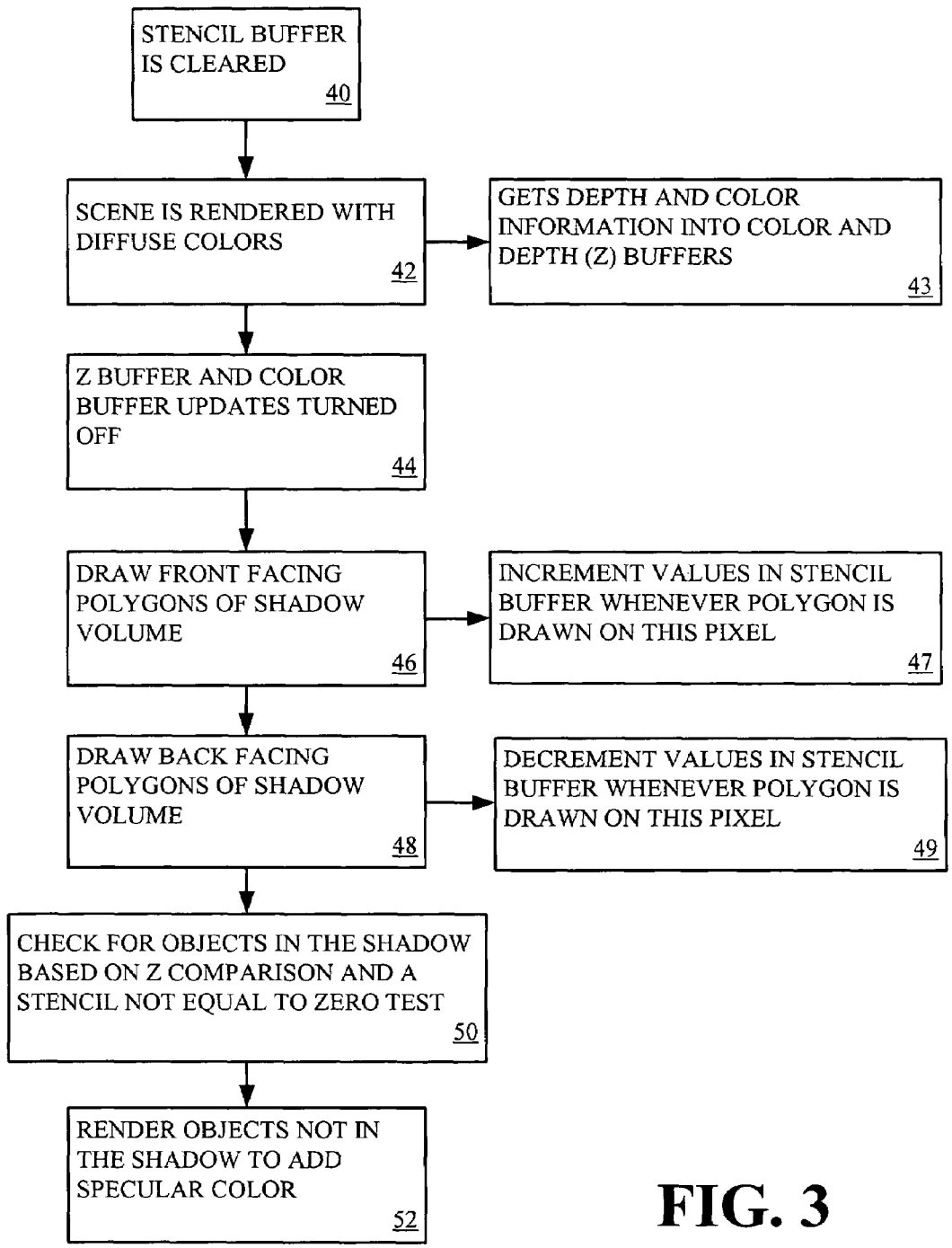
FIG. 3 is a block diagram illustrating the stencil shadow volume method, as is known in the prior art.
Figure 4:
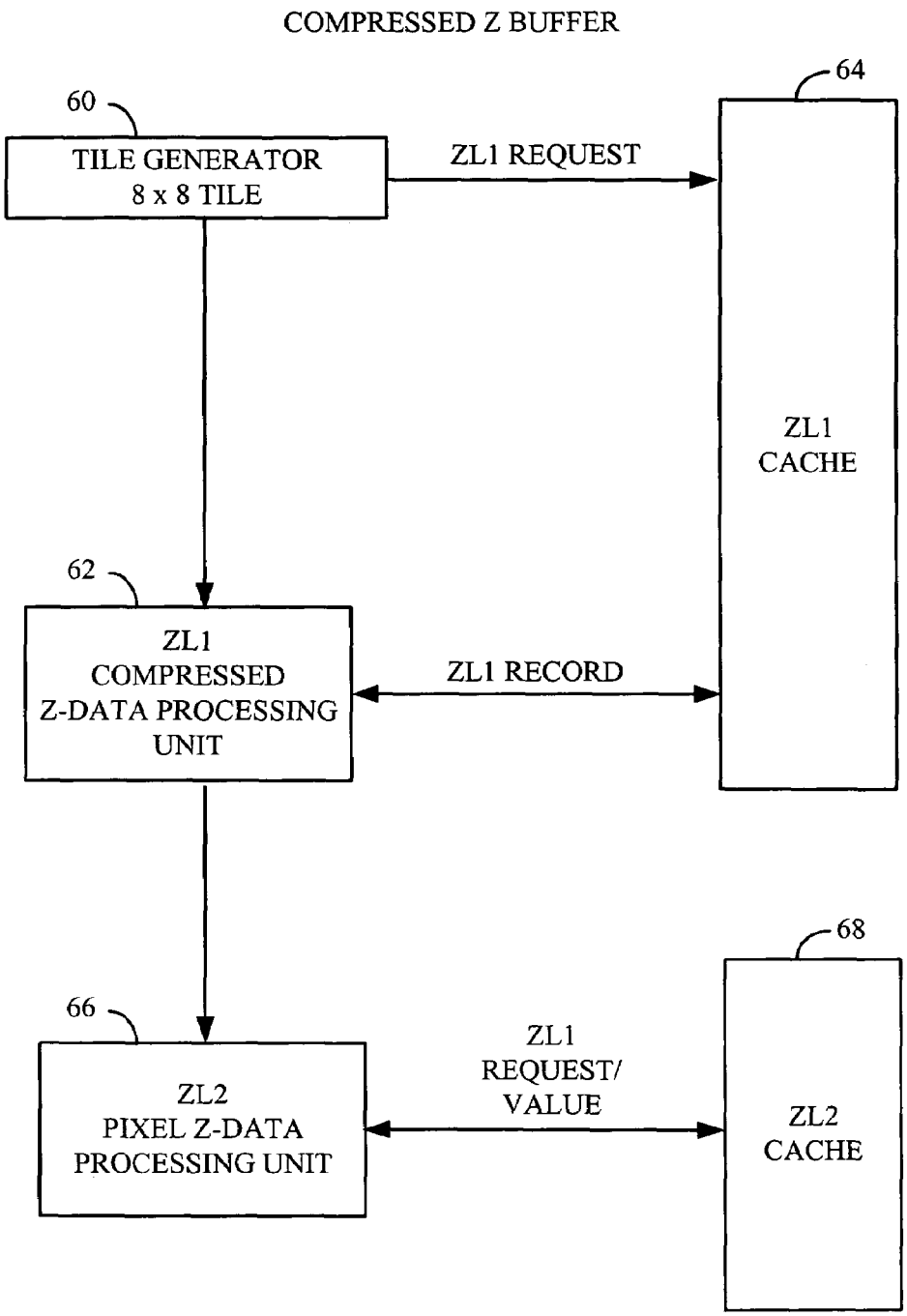
FIG. 4 is block diagram illustrating the implementation of a compressed z-buffer as is known in the prior art.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed therein. On the contrary, the intent is to cover all alternatives, modifications and equivalents included within the spirit and scope of the disclosure as defined by the appended claims.

It is noted that the drawings presented herein have been provided to illustrate certain features and aspects of embodiments of the disclosure. It will be appreciated from the description provided herein that a variety of alternative embodiments and implementations may be realized, consistent with the scope and spirit of the present disclosure.

As summarized above, the present application is directed to embodiments of apparatus, systems and methods of implementing a stencil shadow volume operation in a computer graphics system through the use of the hardware feature of a compressed stencil data processing unit, sometimes referred to as SL1, similar to the compressed z-data processing unit, ZL1. It will be appreciated by one of ordinary skill in the art that the term buffer, as used below in reference to the stencil and z-data processing units, may include the memory and requisite logic to accomplish the associated data processing.

Figure 5:
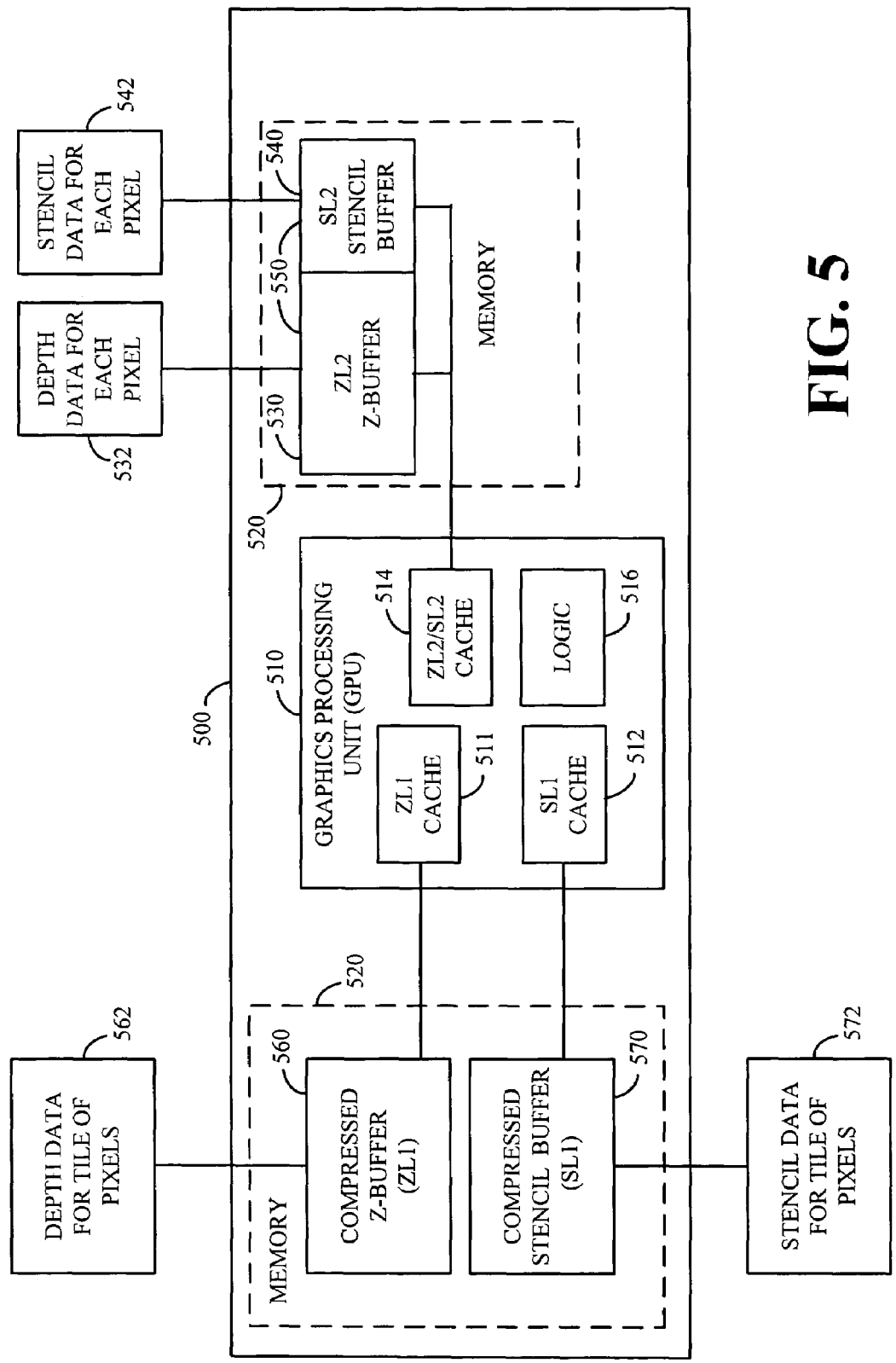
FIG. 5 is block diagram illustrating certain elements of a graphics component constructed in accordance with one embodiment of the invention.

Reference is made briefly to FIG. 5, which illustrates certain basic components of an embodiment of the invention. The interoperation of these components in carrying our certain functions will be understood by reference from the description that follows. As illustrated, the computer graphics hardware 500 may contain a graphics processing unit 510 and memory 520. As an alternative, the memory 520 could be system or host memory or incorporated into the graphics processing unit 510. The memory 520 may include specific allocations for a z-buffer, ZL2 530, and a stencil buffer, SL2 540. The ZL2 530 and SL2 540 data structures may also be combined into a single buffer 550 where, for example, the data record is thirty-two bits with twenty-four bits for the z-value 532 and eight bits for the stencil value 542. As is known, the ZL2/SL2 buffer 550 stores a record for each pixel.

The memory 520 may also include an allocation for a compressed z-buffer, ZL1 560 which, for example, stores the z-data 562 for a group of pixels. As is known, the group of pixels may be a tile, a subtile or more than one tile. Additionally, the memory 520 may include a compressed stencil buffer, SL1 570 which, for example, stores the stencil value 572 for a tile of pixels. As is known, a tile of pixels can be eight-by-eight pixels, eight-by-sixteen pixels or other dimensions determined to produce a desired level of performance.

The graphics processing unit 510 may also include a cache 512, used by SL1 570, and a cache 511, used by ZL1 560, each configurable to allocate portions of the respective caches 512, 511 to store SL1 570 and ZL1 560 records. The graphics processing unit 510 may also include a cache 514, configurable to allocate a portion to store the ZL2/SL2 550 records. The caches 512, 511 and 514 are respectively referred to as SL1 cache, ZL1 cache and ZL2/SL2 cache. The graphics processing unit 510 may further include logic 516 for controlling ZL1 560, SL1 570, ZL2 530 and SL2 540 in, for example, a stencil shadow volume operation. The logic 516 may also be configured to perform compression of depth data and stencil shadow data. The logic 516 may further be configured to generate uncompressed stencil shadow data 542. Additionally, the logic 516 may be configured to selectively merge compressed stencil shadow data 572 and uncompressed stencil shadow data 542 associated with SL1 570 and SL2 540.

Figure 6:
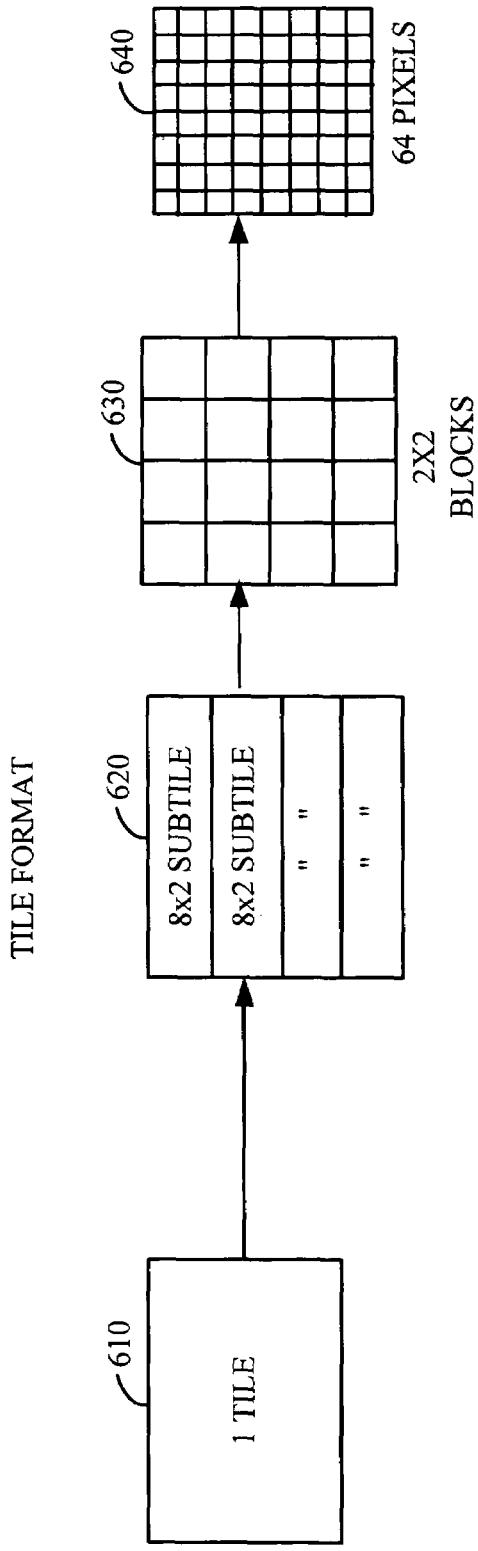
FIG. 6 is a representation illustrating a tile format used in one embodiment of the present invention.

Reference is now made to FIG. 6, illustrating an example of a tile format. In one embodiment of the invention, the tile 610 is comprised of sixty-four pixels 640 configured, for example, in an eight-by-eight arrangement. The tile 610 may also be divided into four subtiles 620, where, for example, each subtile is eight-by-two pixels. The tile 610 may be further divided into sixteen b locks 630 where, for example, each block is four pixels in a two-by-two configuration.

Figure 7:
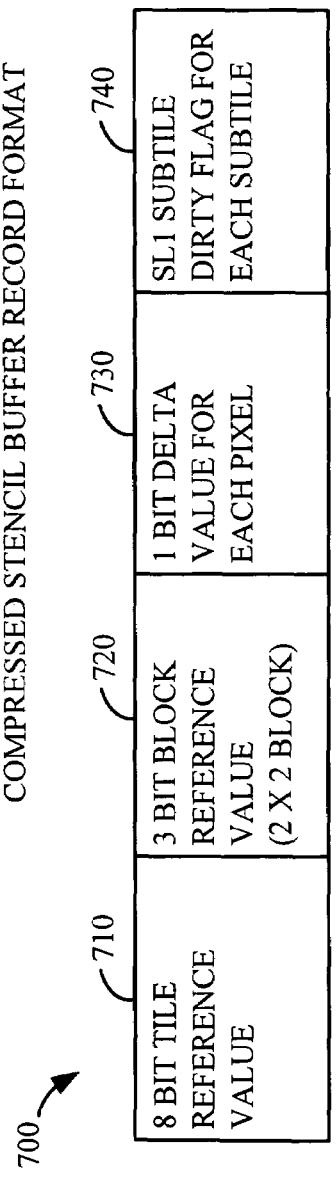
FIG. 7 is a block diagram illustrating the compressed stencil buffer data format of one embodiment of the invention.

An example of a data record format for SL1 570 is illustrated in FIG. 7. In one embodiment, the stencil data 572 in SL1 comprises a record for each tile 610 and corresponds to the tiles in ZL1 560. FIG. 7 illustrates an example of a data record format 700 for an eight-by-eight tile 610 having four eight-by-two subtiles 620. The tile 610 is further divided into sixteen two-by-two blocks 630. The record 700 includes an eight-bit reference value 710 for the tile; a three-bit reference value 720 for each of the sixteen blocks; a one-bit delta value 730 for each of the sixty-four pixels; and a one-bit SL1 subtile dirty bit 740 for each of the four subtiles.

The block data is, for example, represented by a four-bit nibble with a three-bit carry. The four bits each represent a pixel delta value for each of the four pixels in the block. The three-bit carry value represents the reference value for the block. This data format is based on the concept that an adjacent pixels' stencil value difference is usually not greater than one for a statistically significant percentage of pixels. Although the adjacent pixels' stencil value difference cannot be greater than one in SL1, a dynamic range of −4 to +4 is possible for the pixels using the coding scheme as shown in Table 1.

TABLE 1

| Block Reference Value | Pixel Delta = 0 | Pixel Delta = 1 |
| --- | --- | --- |
| 000 | −4 | −3 |
| 001 | −3 | −2 |
| 010 | −2 | −1 |
| 011 | −1 | 0 |
| 100 | 0 | +1 |
| 101 | +1 | +2 |
| 110 | +2 | +3 |
| 111 | +3 | +4 |

Figure 8:
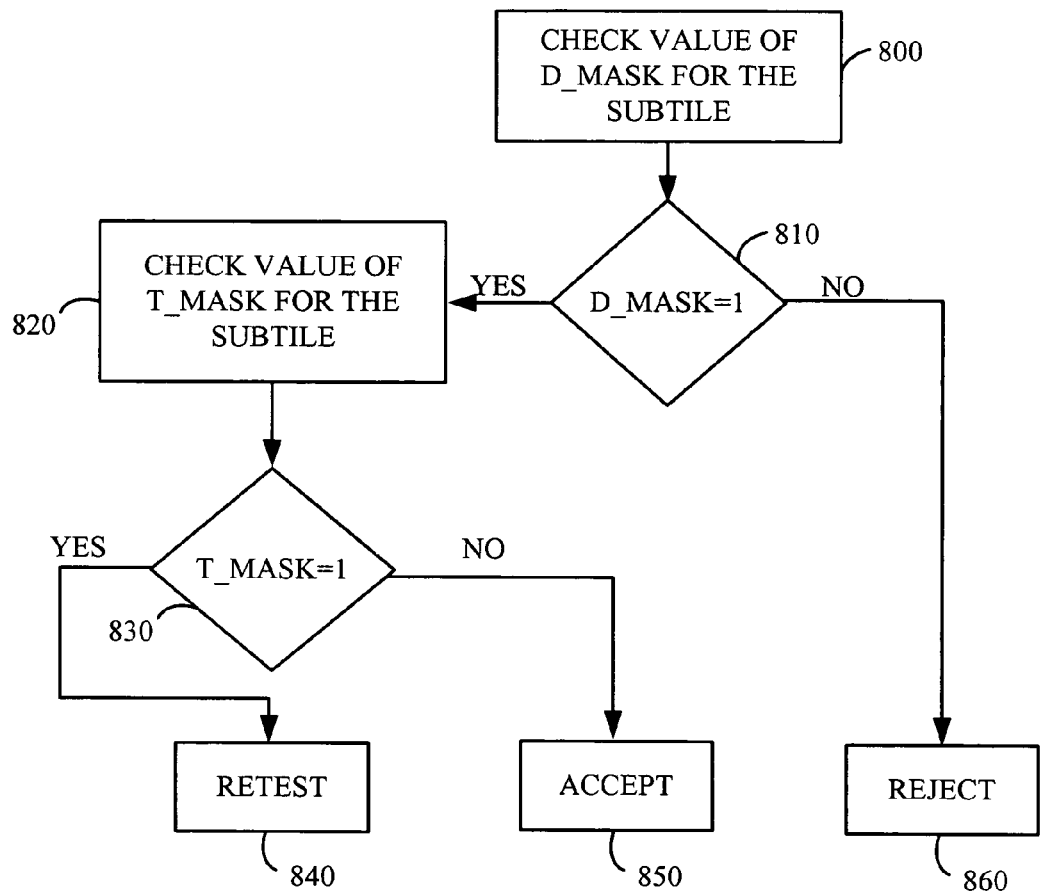
FIG. 8 is a block diagram illustrating one embodiment of logic for determining the ZL1 subtile status.

Reference us now made to FIG. 8, which illustrates one example of logic in ZL1 for determining the status of the subtiles. The first step is to check the value of a D_Mask bit for the subtile 800. The D_Mask is a bit in the ZL1 record and indicates whether the subtile should be drawn. If the value of the D_Mask is zero 810 then the state of the subtile is REJECT 860. If, in the alternative, the D_Mask for the subtile has a value of one 810, then the value of a T_Mask for the subtile is checked 820. The T_Mask is a bit in the ZL1 record and indicates whether the subtile should be retested. If the T_Mask for the subtile has a value of zero 830 then the state of the subtile is ACCEPT 850. If the T_Mask value for the subtile is one 830 then the state of the subtile is RETEST 840. These states are utilized to determine if the subtile is suitable for the SL1 operation.

Figure 9:
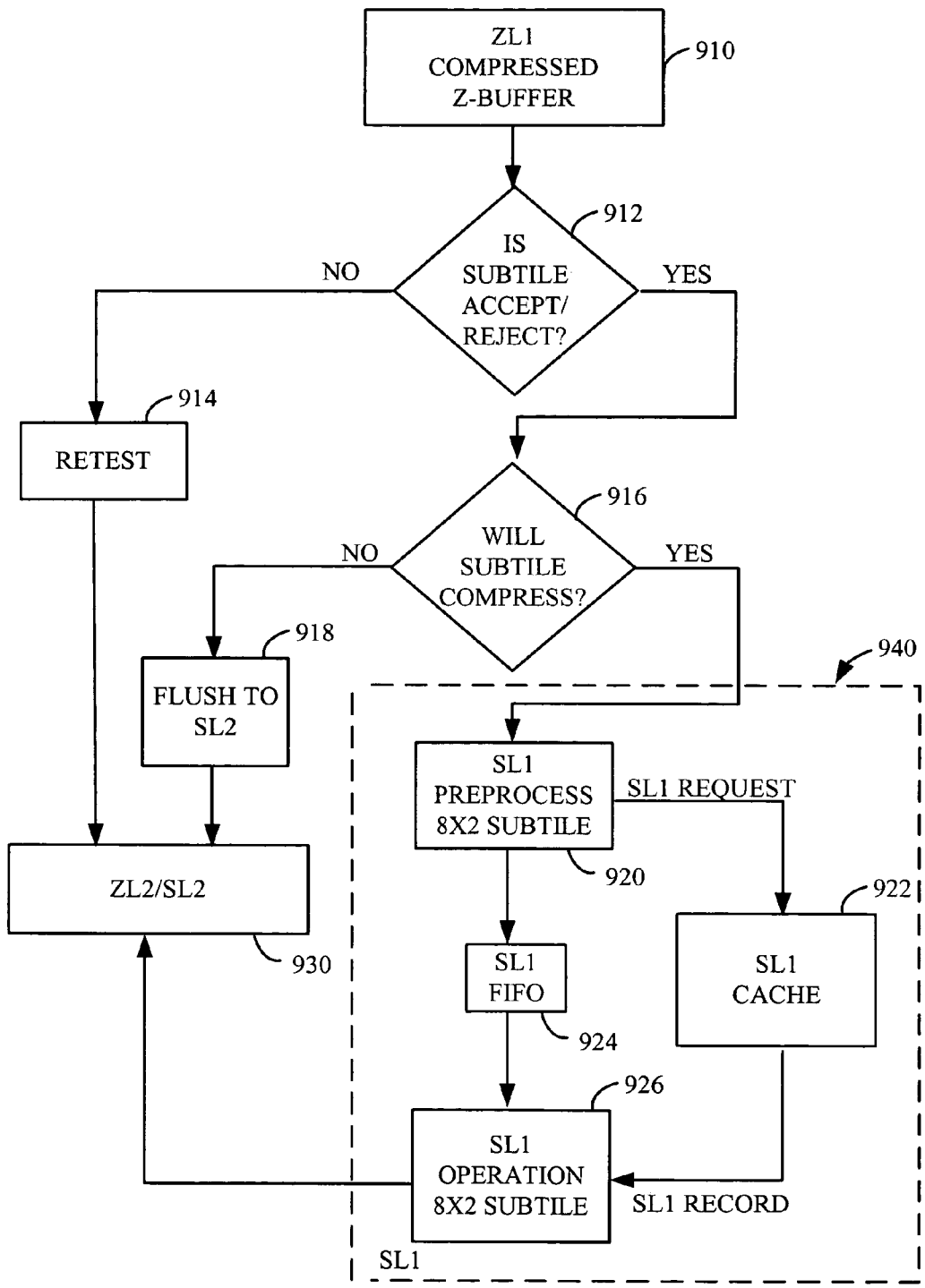
FIG. 9 is a block diagram illustrating one embodiment of the compressed stencil buffer operation in the present invention.

Reference is now made to FIG. 9, which illustrates the implementation of one embodiment of the present invention, described hereinafter. It should be appreciated that implementation of a compressed stencil buffer, SL1, in a stencil shadow volume approach may be accomplished in many different ways and this description merely represents one embodiment of the present invention.

After the status of a subtile of compressed z-data is determined and classified as either RETEST, ACCEPT or REJECT, a determination is made as to whether or not the subtile should be processed by SL1 912. If the subtile is RETEST 914, then the subtile is not suitable for SL1 processing and the stencil operation on that subtile is performed at the pixel or block level in SL2 930. If the subtile status is REJECT or ACCEPT then a determination is made as to whether the subtile information will compress 916. This determination is based on the capacity of the SL1 data record format to accommodate the subtile data. If the data will not compress into a format defined by the data record format then the subtile stencil data is flushed to SL2 918. If the subtile stencil data will compress into SL1 according to the SL1 data record format then the stencil operation is performed on that subtile in SL1 940.

When the stencil operation is performed on a subtile in SL1 940, the SL1 preprocess 920, as discussed below, makes an SL1 request to the SL1 cache 922 and places the cache information for the subtile stencil record in the SL1 FIFO 924. The SL1 operation 926 performs the increment and decrement operations consistent with a stencil shadow volume method and merges the compressed data into SL2 930. Additionally, in one embodiment, the SL1 operation 926 performs checks to verify that overflow or underflow conditions in the stencil data record are addressed to prevent data corruption or loss. Examples of these functions are discussed in greater detail below.

Figure 10:
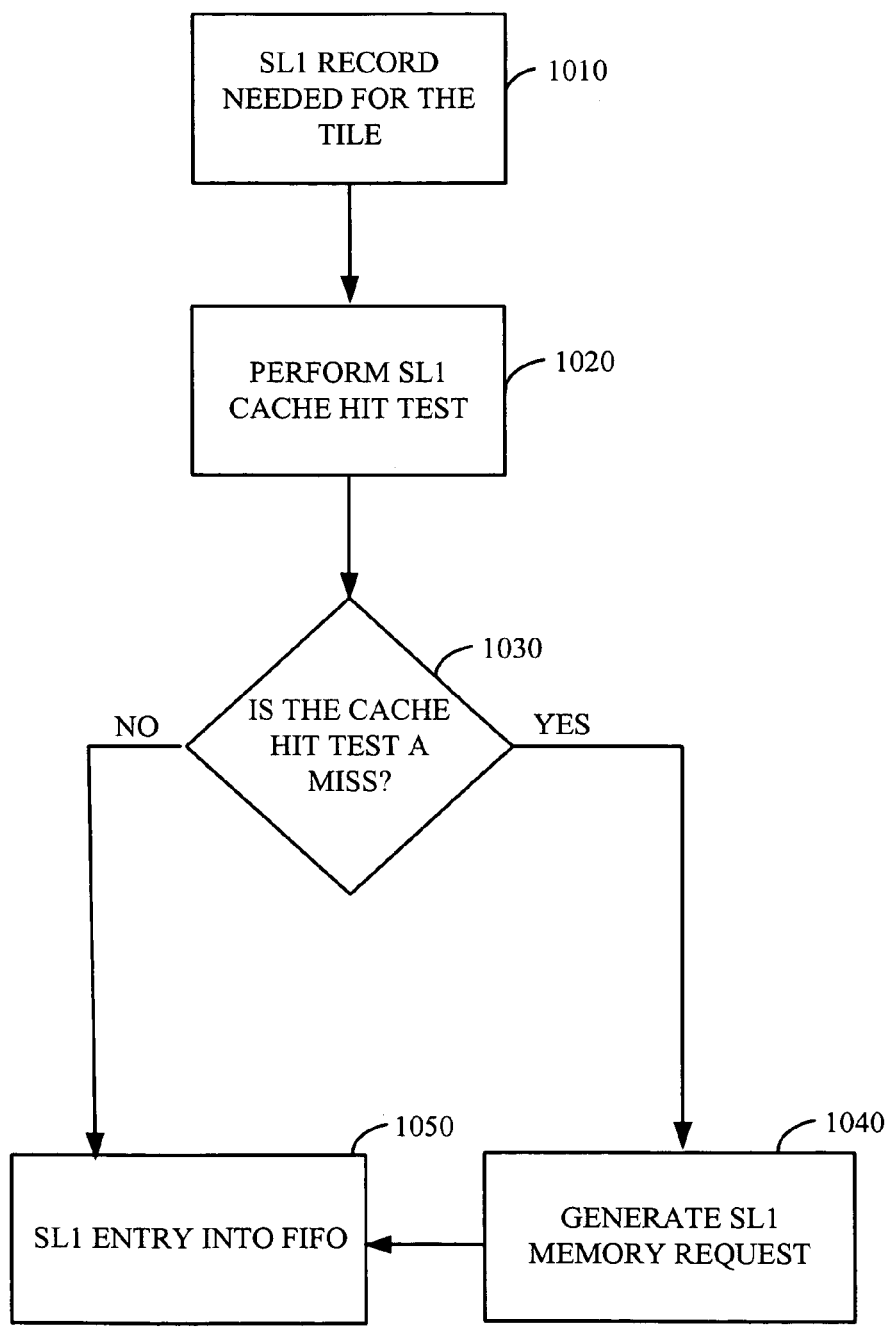
FIG. 10 is a block diagram illustrating one embodiment of the SL1 pre-process step.

Reference is now made to FIG. 10, which illustrates an example of the SL1 preprocess discussed above. In one embodiment, any subtile in ZL1 that has an ACCEPT or REJECT status requires an SL1 record 1010. An SL1 cache hit test 1020 is performed on the SL1 cache and the SL1 entry is put into a deep FIFO 218 in order to compensate for the memory access latency. If the cache hit test is a miss 1030, then an SL1 memory request is generated 1040.

Figure 11:
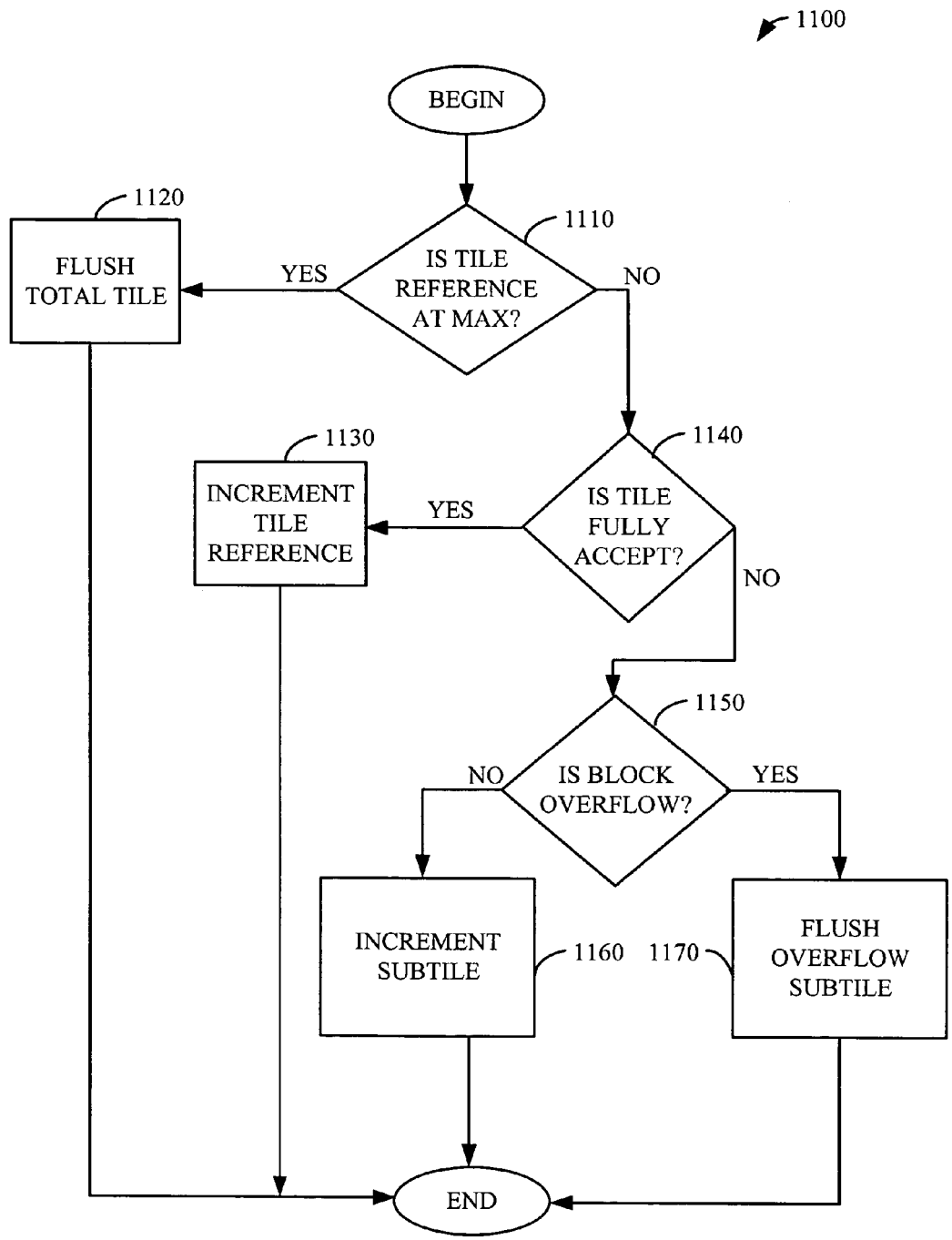
FIG. 11 is a block diagram illustrating one embodiment of the SL1 increment operation.

Reference is now made to FIG. 11, which illustrates a process sequence block diagram of the SL1 increment operation 1100 in one embodiment of the invention. The first step in the SL1 increment operation is to determine if the tile reference value is at the maximum value 1110 based on the format of the stencil data record. If the tile reference is at the maximum value then SL1 will flush the stencil data for the entire tile 1120 to SL2 for the stencil process to be performed, for example, on the pixel level. If the tile reference value is not at the maximum value, then the increment process will determine if every subtile in the tile has an ACCEPT status 1140. If the tile is fully ACCEPT, then the tile reference value is incremented 1130 and the increment operation is complete. If the tile does not have a fully ACCEPT status, then the blocks are checked for an overflow condition 1150. If any of the pixels in a block is in overflow then the block is in an overflow condition. If none of the blocks in a subtile are in an overflow condition then the subtile is incremented 1160. The stencil data for any subtile having a block in an overflow condition is flushed to SL2 1170 for the stencil process to be performed, for example, on the pixel level. Operations on the pixel level may be performed in a block or other logical group of pixels.

By way of example, consider the increment operation on a subtile in a compressed stencil buffer record, where the tile reference value is between the minimum and maximum values and the tile is divided into four subtiles respectively referenced as A, B, C, and D. Assume, for example, that subtile C does not have an accept status due to an underflow condition in at least one of the sixteen blocks in that subtile and that no other blocks in the tile have an underflow condition. Further, assume that subtile D does not have an accept status due to an overflow condition in at least one of the sixteen blocks in that subtile and that no other blocks in the tile have an overflow condition. Since subtiles A, B, and C do not have any overflowing blocks, the block reference values for all blocks in those subtiles is incremented. Since subtile D cannot be incremented due to the overflow of one block reference value, the stencil values for all pixels in subtile D are flushed to the pixel stencil buffer.

Figure 12:
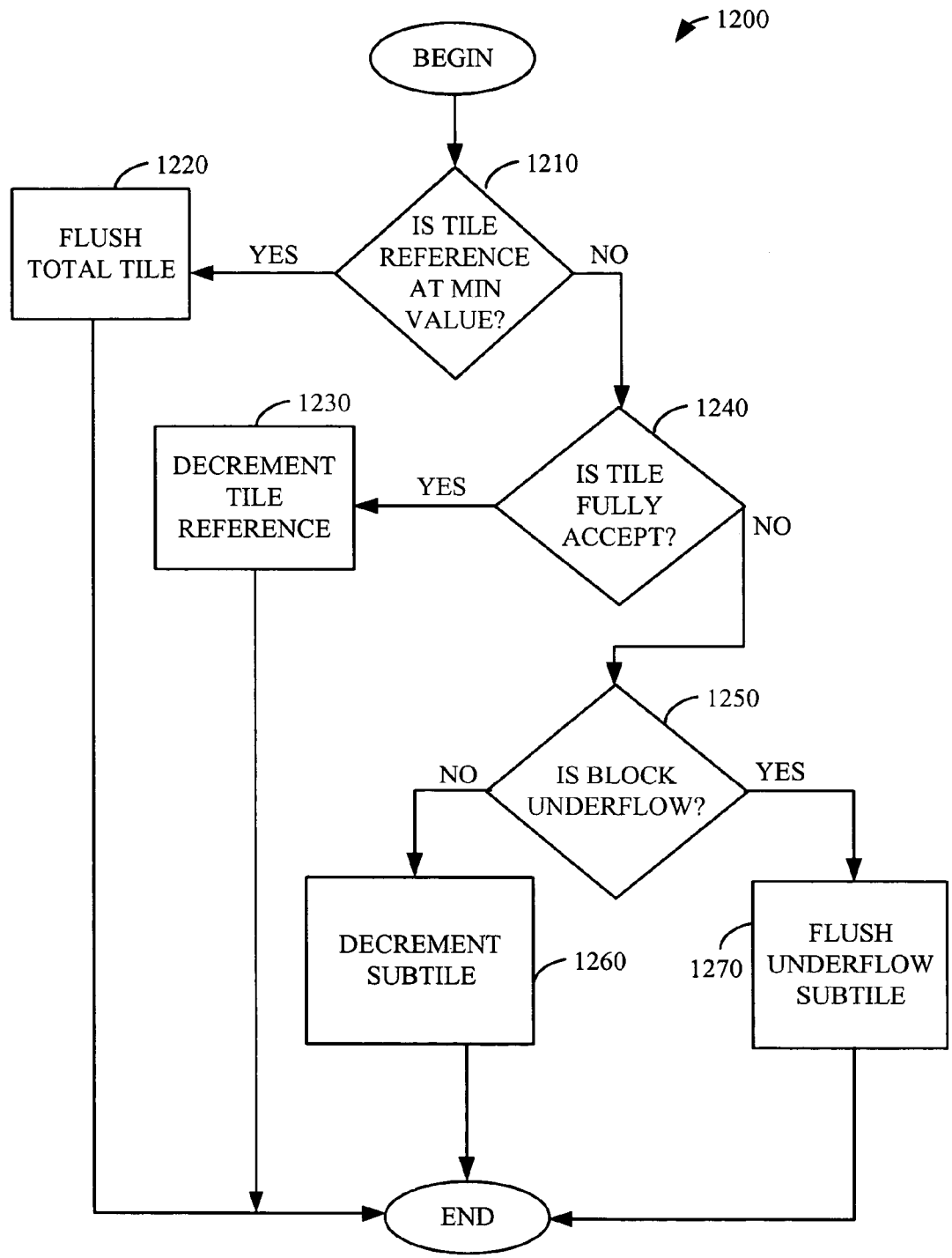
FIG. 12 is a block diagram illustrating one embodiment of the SL1 decrement operation.

Reference is now made to FIG. 12, which illustrates a process sequence block diagram of the SL1 decrement operation 1200 in one embodiment of the invention. The first step in the SL1 decrement operation is to determine if the tile reference value is at the minimum value 1210 based on the format of the stencil data record. If the tile reference is at the minimum value then SL1 will flush the stencil data for the entire tile 1220 to SL2 for the stencil process to be performed, for example, on the pixel level. If the tile reference value is not at the minimum value, then the decrement process will determine if every subtile in the tile has an ACCEPT status 1240. If the tile is fully ACCEPT, then the tile reference value is decremented 1230 and the decrement operation is complete. If the tile does not have a fully ACCEPT status, then the blocks are checked for an underflow condition 1250. If any of the pixels in a block is in underflow then the block is in an underflow condition. If none of the blocks in a subtile are in an underflow condition then the subtile is decremented 1260. The stencil data for any subtile having a block in an underflow condition is flushed to SL2 1270 for the stencil process to be performed, for example, on the pixel level. Operations on the pixel level may be performed in a block or other logical group of pixels.

Using the compressed stencil buffer record of the above example, consider the decrement operation. Since subtiles A, B, and D do not have any overflowing blocks, the block reference values for all blocks in those subtiles is decremented. Since subtile C cannot be decremented due to the underflow of one block reference value, the stencil values for all pixels in subtile C are flushed to the pixel stencil buffer. In the alternative, if all subtiles in the tile of the above example have an accept status, then the tile reference value is modified in accordance with the corresponding increment or decrement operation.

Figure 13:
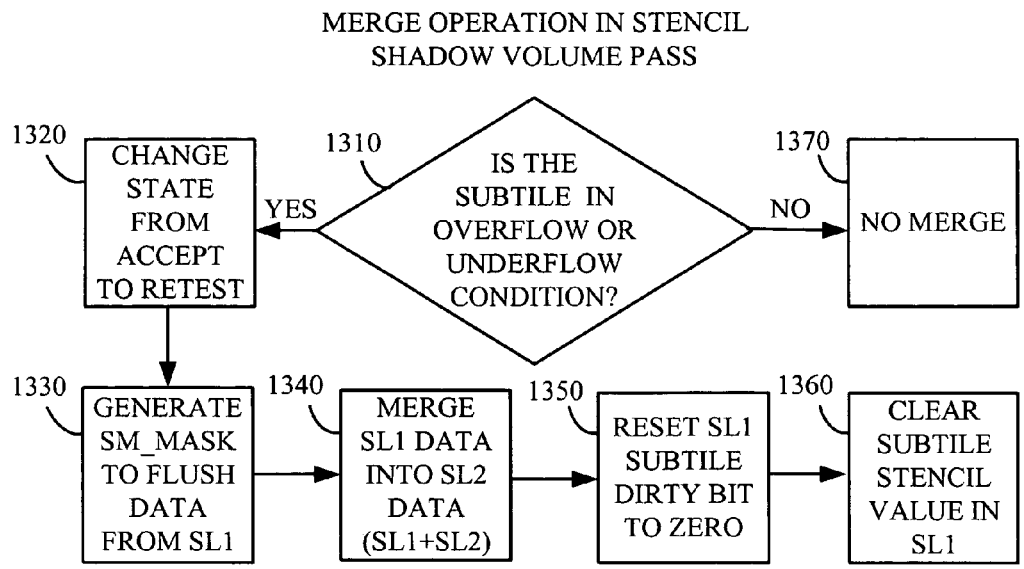
FIG. 13 is a block diagram illustrating a merge operation in the stencil shadow volume pass.

As discussed above, when the subtile dirty flag is set in SL1, the SL1 data is merged into SL2. The merge operation addresses the situation where the final stencil value is distributed in both SL1 and SL2. The merge operation can either happen in the stencil shadow volume pass or the specular color pass. In the stencil shadow volume pass, as illustrated in FIG. 13, the subtile may be in the condition of overflow or underflow 1310. When this occurs, the state of the subtile will be converted from ACCEPT to RETEST 1320. Additionally, a SM_Mask is generated 1330 to merge the data from SL1 into SL2. The SM_Mask is an extra mask added by the output of SL1 to indicate if the merge of SL1 and SL2 is enabled. The final value, which is the sum of SL1+SL2, is written into SL2 1340. After the data is merged to SL2, the SL1 subtile dirty bit is reset to zero 1350 to indicate that the subtile is clean and the subtile stencil value can be cleared 1360. This dynamic merge reduces the chance of overflow and underflow for each subtile.

Figure 14:
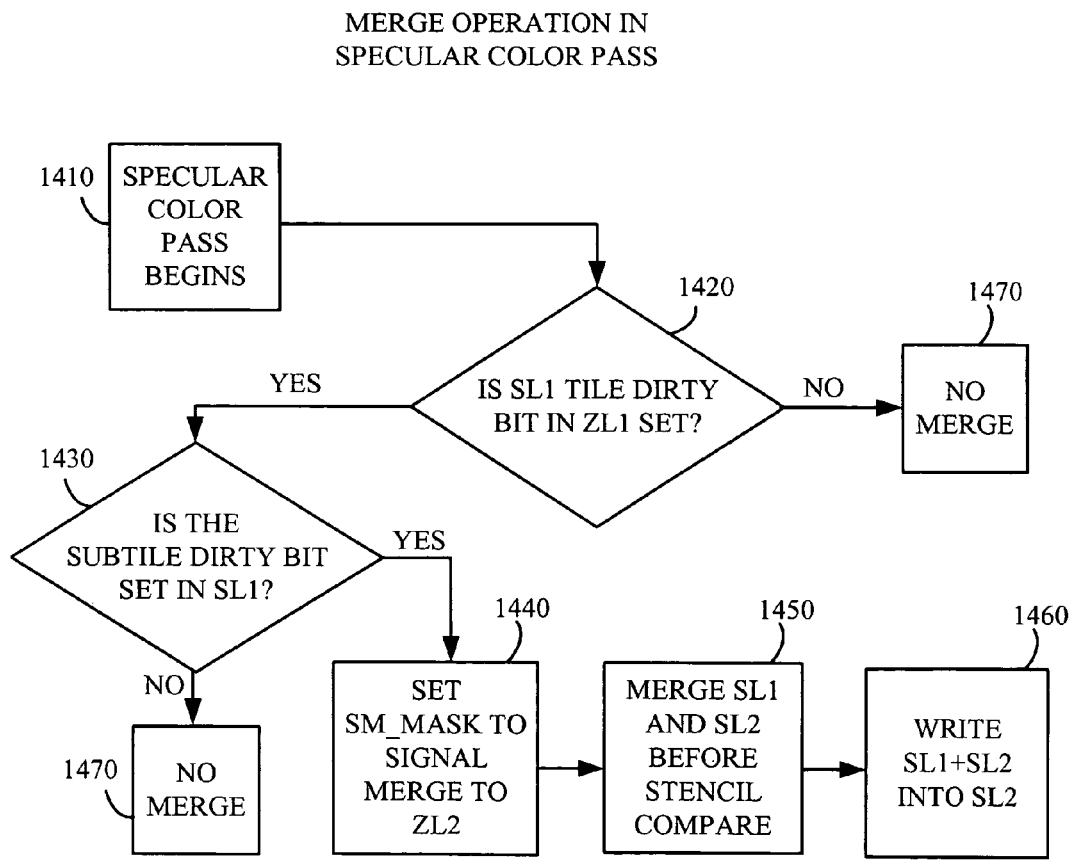
FIG. 14 is a block diagram illustrating a merge operation of the specular color pass.

Reference is now made to FIG. 14. In the specular color pass, a bit in the ZL1 control register triggers the SL1 and SL2 merge operation. This bit is set when the specular pass begins 1410 if the SL1 tile dirty bit in ZL1 1420 is set and the subtile dirty bit in SL1 1430 is set. The SM_Mask 1440 is set to signal ZL2 to merge SL1 and SL2 before the stencil compare 1450 and then to write the sum of SL1 and SL2 back to SL2 1460.

Figure 15:
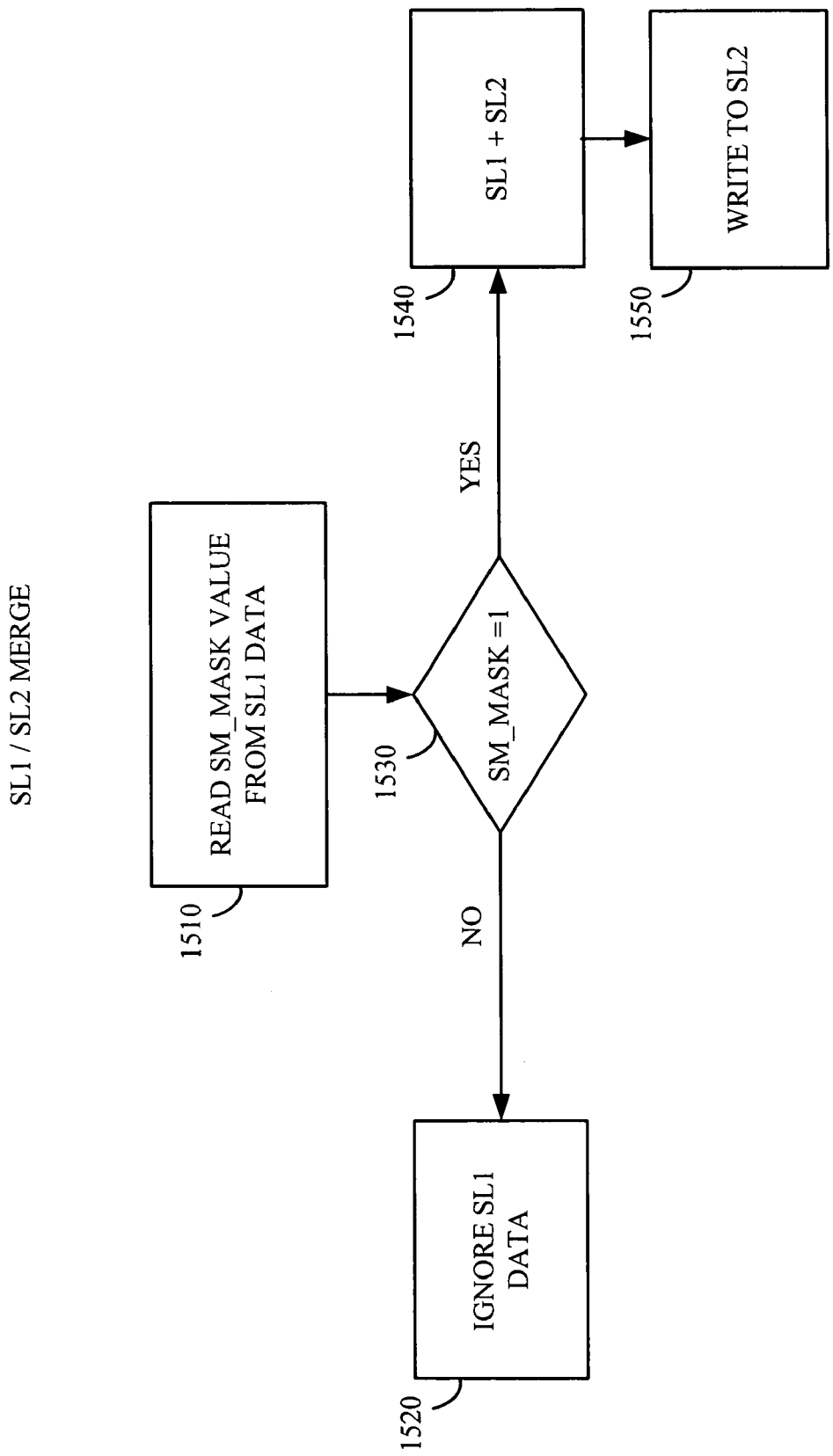
FIG. 15 is a block diagram illustrating one embodiment of the compressed stencil buffer merge operation.

The SL1/SL2 merge is signaled, as discussed above, by the SM_Mask bit being set for the subtile. Reference is now made to FIG. 15, which illustrates the general merge process. The SM_Mask value is read from SL1 1510. In the case where the SM_Mask value is zero 1530, no operations are performed on the SL1 data 1520. Otherwise, where the SM_Mask value is one 1530, the sum of the values in SL1 and SL2 is generated 1540 and this final value is written to SL2 1550.

Figure 16:
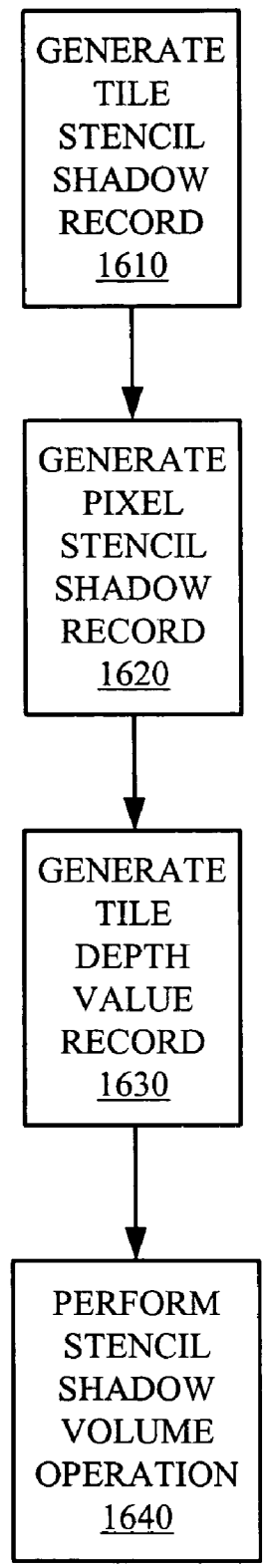
FIG. 16 is a block diagram illustrating one embodiment of the compressed stencil buffer in a stencil shadow volume operation.

Brief reference is now made to FIG. 16, which illustrates one embodiment of the compressed stencil buffer in a stencil shadow volume operation. A tile stencil shadow record is generated 1610, which corresponds to a tile, where the tile is subdivided into a plurality of subtiles, which are further subdivided into a plurality of blocks of multiple pixels. Additionally, and in cooperation with the tile stencil shadow record, a pixel stencil shadow record is generated 1620 to accommodate a stencil shadow value for each pixel. The pixel stencil shadow record is necessary in the case where the stencil shadow data exceeds the capacity of the tile stencil shadow record. Additionally, a tile depth value record is generated 1630 corresponding to the depth data of the pixels in the tile stencil shadow record. A stencil shadow volume operation is performed 1640, where the operation is performed utilizing the tile stencil shadow record when possible. Where the tile stencil shadow record cannot accommodate the stencil shadow operation, the operation is performed at the pixel level utilizing the pixel stencil shadow record.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. An apparatus for use in a computer graphics system, comprising:
   a compressed stencil buffer; and
   a compressed stencil buffer cache, wherein the compressed stencil buffer comprises a compressed stencil shadow volume data record for a group of pixels, wherein the compressed stencil shadow volume data record comprises a tile reference stencil value;
   wherein the group of pixels comprises a tile, wherein the tile further comprises a plurality of subtiles, wherein each of the plurality of subtiles comprises a plurality of blocks,
   wherein the compressed stencil shadow volume data record further comprises a plurality of pixel delta values, wherein each of the plurality of pixel delta values corresponds to a pixel in the tile.

2. The apparatus of claim 1, wherein the compressed stencil shadow volume data record further comprises a block reference value for each of the plurality of blocks.

3. The apparatus of claim 2, wherein the compressed stencil shadow volume data record further comprises a plurality of subtile dirty bits, wherein each of the plurality of subtile dirty bits corresponds to each of the plurality of subtiles in the tile.

4. The apparatus of claim 3, wherein a pixel stencil value further comprises:
   one of the plurality of subtile dirty bits;
   the tile reference stencil value;
   one of the plurality of block reference values; and
   one of the plurality of pixel delta values.

5. The apparatus of claim 2, wherein the size of the compressed stencil shadow volume data record further comprises less than 129 bits.

6. A system comprising:
   a first stencil buffer configured to perform a stencil shadow volume operation on a group of pixels, wherein the group of pixels comprises a tile; wherein the first stencil buffer is further configured to perform a stencil operation on a pixel wherein the pixel is in the group of pixels;
   a graphics processing unit configured to generate a shadow effect, wherein the shadow effect is generated with a stencil shadow volume operation;
   logic within the graphics processing unit configured to store a tile stencil record in the first stencil buffer;
   a plurality of pixel delta values, wherein each of the plurality of pixel delta values corresponds to one of the plurality of pixels in the tile;
   a first stencil buffer cache; wherein the first stencil buffer cache is configured to communicate with the first stencil buffer;
   a first depth buffer configured to store a tile depth data record;
   a second depth buffer configured to store a pixel depth data record;
   a second stencil buffer configured to store a pixel stencil record, wherein the second depth buffer and the second stencil buffer are combined, wherein the pixel stencil record is combined with the pixel depth record;
   a plurality of subtiles, wherein the plurality of subtiles comprises the tile; and
   a plurality of blocks, wherein the plurality of blocks comprises one of the plurality of subtiles.

7. The system of claim 6, wherein the tile stencil record further comprises:
   a tile reference stencil value;
   a plurality of block stencil values; wherein each of the plurality of block stencil values corresponds to one of the plurality of blocks;
   a plurality of subtile values, wherein each of the plurality of subtile values corresponds to one of the plurality of subtiles in the tile.

8. The system of claim 7, further comprising a tile stencil record length less than 129 bits.

9. The system of claim 6, further comprising dynamic flush logic configured to selectively flush a tile stencil data record to the second stencil buffer, wherein the tile stencil data record is not compressed in the first stencil buffer.

10. A method of rendering shadows in a computer graphics system, comprising:
    evaluating a subtile for compression, the subtile associated with a compressed z-data buffer, wherein the evaluating step further comprises determining whether the subtile stencil data is compressible within a compressed record format;
    determining the subtile status, wherein the subtile status is one of the group consisting of retest, reject and accept;
    reading a first mask value, wherein if the first mask value is one then the subtile status is reject;
    reading a second mask value, wherein if the second mask value is one then the subtile status is retest, and wherein if the second mask value is zero then the subtile status is accept;
    selectively flushing the subtile to a pixel z-data/stencil buffer, wherein the flushed subtile does not compress in a compressed stencil buffer wherein flushing step comprises:
       flushing the subtile wherein the subtile status is reject; and
       flushing the subtile wherein the subtile stencil data is not compressible;
    performing the stencil shadow volume operation in a compressed stencil buffer, wherein the performing step further comprises preprocessing the subtile stencil data, wherein a request is made to a compressed stencil buffer cache and wherein compressed stencil buffer cache data is placed into a compressed stencil buffer FIFO; and utilizing the result of the stencil shadow volume operation to display pixels in the computer graphics system.

11. The method of claim 10, wherein the flushing step further comprises flushing the subtile if the subtile status is reject.

12. The method of claim 10, wherein the performing step further comprises the step of selectively incrementing a compressed stencil record, wherein the compressed stencil record is not incremented if a tile reference value is at the maximum value.

13. The method of claim 12, wherein the tile reference value is incremented if the subtile status for each subtile in a tile is accept, wherein each of a plurality of blocks in the subtile is checked for overflow if the subtile status for any subtile in the tile is reject.

14. The method of claim 13, wherein subtile reference value is incremented if none of the plurality of blocks within the subtile is in overflow.

15. The method of claim 10, wherein the performing step further comprises the step of selectively decrementing a compressed stencil record, wherein the compressed stencil record is not decremented if a tile reference value is at the minimum value.

16. The method of claim 15, wherein the tile reference value is decremented if the subtile status for each subtile in a tile is accept, wherein each of a plurality of blocks in the subtile is checked for underflow if the subtile status for any subtile in the tile is reject.

17. The method of claim 16, wherein subtile reference value is decremented if none of the plurality of blocks within the subtile is in underflow.

18. In a computer graphics system, a method of merging compressed stencil data into a pixel stencil buffer in a stencil shadow volume pass, the method comprising:

testing a subtile for a first condition and a second condition, wherein the first condition comprises subtile underflow, wherein the second condition comprises subtile overflow, and wherein if either the first condition or the second condition is true a subtile status is changed from accept to retest;

setting a subtile merge mask, for identifying compressed stencil data in a compressed stencil buffer to flush into a pixel stencil buffer;

merging the compressed stencil data into the pixel stencil buffer, such that a resultant value is the sum of the compressed stencil data and stencil data in the pixel stencil buffer;

resetting a subtile dirty bit in the compressed stencil buffer, wherein the reset value is zero;

clearing the compressed stencil value in the compressed stencil buffer; and utilizing the result of the merger of compressed stencil data into the compressed stencil buffer to display pixels in the computer graphics system.

19. The method of claim 18, the merging step further comprising:

reading the subtile merge mask from the compressed stencil data;

ignoring the compressed stencil data if the subtile merge mask is zero; and merging the compressed stencil data into the pixel stencil buffer if the subtile merge mask is one.

20. In a computer graphics system, a method of merging compressed stencil data into a pixel stencil buffer in a specular color pass, the method comprising:

reading a tile dirty bit in a compressed stencil data record, wherein if the tile dirty bit is zero then a merge operation is not performed;

reading a subtile dirty bit in the compressed stencil data record, wherein if the subtile dirty bit is zero then the merge operation is not performed;

setting a subtile merge mask, for identifying compressed stencil data in a compressed stencil buffer to flush into a pixel stencil buffer;

merging the compressed stencil data and pixel stencil data;

writing the sum of the compressed stencil data and pixel stencil data into the pixel stencil buffer; and utilizing the result of the merger of compressed stencil data into the compressed stencil buffer to display pixels in the computer graphics system.

* * * * *